US009002881B2

(12) United States Patent
Bocharov et al.

(10) Patent No.: US 9,002,881 B2
(45) Date of Patent: Apr. 7, 2015

(54) ASSEMBLING STREAMED CONTENT FOR ON-DEMAND PRESENTATION

(75) Inventors: John A. Bocharov, Seattle, WA (US); John C. Simmons, North Bend, WA (US); Robert K. Hughes, Seattle, WA (US); Sudheer Sirivara, Redmond, WA (US); Charles A. Finkelstein, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 387 days.

(21) Appl. No.: 12/608,447

(22) Filed: Oct. 29, 2009

(65) Prior Publication Data
US 2011/0106847 A1 May 5, 2011

(51) Int. Cl.
G06F 17/30 (2006.01)
H04L 29/06 (2006.01)

(52) U.S. Cl.
CPC .......... *H04L 65/4084* (2013.01); *H04L 65/602* (2013.01)

(58) Field of Classification Search
None
See application file for complete search history.

(56) References Cited

U.S. PATENT DOCUMENTS

| 7,277,958 | B2 | 10/2007 | Chung et al. |
| 7,325,192 | B1 | 1/2008 | Bialek et al. |
| 7,383,346 | B2 | 6/2008 | Gemmell |
| 7,548,948 | B2 | 6/2009 | Klemets et al. |
| 2003/0018978 | A1 | 1/2003 | Singal et al. |
| 2006/0155790 | A1 | 7/2006 | Jung et al. |
| 2006/0161635 | A1* | 7/2006 | Lamkin et al. ................ 709/217 |
| 2007/0011237 | A1 | 1/2007 | Mockett |
| 2007/0250445 | A1 | 10/2007 | Ache |
| 2008/0133767 | A1 | 6/2008 | Birrer et al. |
| 2008/0155114 | A1 | 6/2008 | Mungavan et al. |

(Continued)

FOREIGN PATENT DOCUMENTS

| CN | 101267541 | 9/2008 |
| JP | 2005525011 | 8/2005 |

(Continued)

OTHER PUBLICATIONS

"Microsoft Smooth Streaming Provides True High-Definition Video Delivery", Retrieved at <<http://www.microsoft.com/presspass/press/2009/apr09/04-20SmoothStreamingPR.mspx>>, Apr. 20, 2009, pp. 2.

(Continued)

*Primary Examiner* — Belix M Ortiz Ditren
(74) *Attorney, Agent, or Firm* — Dan Choi; Judy Yee; Micky Minhas

(57) ABSTRACT

Assembling streamed content for on-demand presentation is described. In embodiments, a media asset can be requested from a content distributor, and cacheable segments of the media asset are streamed to the requesting client device. The cacheable segments are received in an initial quality display format for uninterrupted playback of the media asset at the client device while the cacheable segments are being received. An asset matrix that correlates a bit rate and a time position for each cacheable segment in the media asset is also received. The cacheable segments of the media asset can be assembled according to the asset matrix to generate an assembled asset data file of the media asset. The assembled asset data file can then be back-filled with selected ones of the cacheable segments that are replaced with a highest quality display format for on-demand presentation of the media asset when selected for viewing.

20 Claims, 6 Drawing Sheets

(56) References Cited

U.S. PATENT DOCUMENTS

| | | | |
|---|---|---|---|
| 2009/0106451 | A1 | 4/2009 | Zuckerman et al. |
| 2009/0113253 | A1 | 4/2009 | Wang et al. |
| 2009/0150518 | A1 | 6/2009 | Lewin et al. |
| 2009/0178089 | A1 | 7/2009 | Picco et al. |
| 2009/0249222 | A1 | 10/2009 | Schmidt et al. |
| 2012/0210015 | A1* | 8/2012 | Baldwin ................. 709/231 |

FOREIGN PATENT DOCUMENTS

| | | |
|---|---|---|
| JP | 2005303925 | 10/2005 |
| JP | 2007013473 | 1/2007 |
| JP | 2007028228 | 2/2007 |
| JP | 2007097008 | 4/2007 |
| JP | 2009525704 | 7/2009 |
| WO | WO-9613125 | 5/1996 |
| WO | WO-2004017602 | 2/2004 |
| WO | WO-2008057750 | 5/2008 |
| WO | WO-2010051169 | 5/2010 |
| WO | WO-2010107625 | 9/2010 |
| WO | WO-2010107627 | 9/2010 |

OTHER PUBLICATIONS

Krasic, et al., "Quality•Adaptive Media Streaming by Priority Drop", Retrieved at <<http://www.cs.ubc.ca/~krasic/publications/krasic-nossdav03.pdf>>, NOSSDAV'03, Jun. 1-3, 2003, Monterey, California, USA, pp. 10.

Ansari et al., "Implementation of a Motion Detection System", Retrieved at <<http://209.85.229.132/search?q=cache:http://www.waset.org/ijcs/v3/v3-1-9.pdf>>, International Journal of Computer Science vol. 3, No. 1, pp. 52-63.

"International Search Report", Mailed Date: May 25, 2011, Application No. PCT/US2010/053634, Filed Date: Oct. 21, 2010, pp. 8.

"EP Search Report", European Application No. 10830410.6, (Jun. 26, 2013), 5 Pages.

"Foreign Office Action", Chinese Application No. 201080049243.4, (Aug. 12, 2013), 7 Pages.

"Foreign Office Action", European Application No. 10830410.6, (Jul. 22, 2013), 5 Pages.

"Foreign Office Action", Chinese Application No. 201080049243.4, (Jun. 20, 2013), 6 Pages.

Farber, Nikolaus et al., "Adaptive progressive download based on the MPEG-4 file format", *Journal of Zhejiang University Science A; An International Applied Physics & Engineering Journal*. Springer. Berlin. DE. vol. 7. No. 1, (Jan. 1, 2006), 6 Pages.

"Foreign Office Action", Chinese Application No. 201080049243.4, (Mar. 14, 2013), 8 pages.

"Foreign Office Action", CN Application No. 201080049243.4, Oct. 10, 2013, 10 Pages.

"Intent to Grant", EP Application No. 10830410.6, Nov. 28, 2013, 5 Pages.

"Notice of Allowance Issued in Chinese Patent Application No. 201080049243.4", Mailed Date: Feb. 10, 2014, Filed Date: Oct. 21, 2010, 4 Pages.

"Foreign Office Action", JP Application No. 2012-536893, Jun. 30, 2014, 11 Pages.

* cited by examiner

ASSEMBLING STREAMED CONTENT FOR ON-DEMAND PRESENTATION

BACKGROUND

Internet-based television delivery systems are designed to stream video when requested by a user for immediate live viewing, or download the video in advance of when the user may want to watch the video after it has been recorded. In addition, a system may be setup so that the user can start playback of a video that is still downloading before the download is complete. This is commonly referred to as progressive playback. When a user initiates a request for a video, the user may then choose to begin streaming the video or downloading the video. When video is streamed for viewing at a television client device, such as when a user orders an on-demand video and begins watching it, the video data is not stored for later viewing and cannot be copied to another playback device. If the user initiates a download of the video, then the user typically will have to wait until the video data is downloaded to the television client device to begin watching the video, and this delay may be longer due to the size of the video data file, bandwidth constraints, and/or device download limitations.

SUMMARY

This summary is provided to introduce simplified concepts of assembling streamed content for on-demand presentation. The simplified concepts are further described below in the Detailed Description. This summary is not intended to identify essential features of the claimed subject matter, nor is it intended for use in determining the scope of the claimed subject matter.

Assembling streamed content for on-demand presentation is described. In embodiments, a media asset can be requested from a content distributor, and cacheable segments of the media asset are streamed to the requesting client device. The cacheable segments are received in an initial quality display format for uninterrupted playback of the media asset at the client device while the cacheable segments are being received. An asset matrix that correlates a bit rate and a time position for each cacheable segment in the media asset is also received. The cacheable segments of the media asset can be assembled according to the asset matrix to generate an assembled asset data file of the media asset. The assembled asset data file can then be back-filled with selected ones of the cacheable segments that are replaced with a highest quality display format for on-demand presentation of the media asset when selected for viewing.

In other embodiments, metadata corresponding to each of the cacheable segments of the media asset can be maintained, where the metadata indicates the initial quality display format of each of the cacheable segments. The cacheable segments selected to back-fill the assembled asset data file can be selected based on display content corresponding to the cacheable segments that will visually upgrade the media asset when displayed for viewing. The selected cacheable segments can be requested from the content distributor based on an identification of a cacheable segment in the asset matrix, and the selected cacheable segments can be maintained in a separate data file when received. The bandwidth utilized to download the selected cacheable segments can be regulated when back-filling the assembled asset data file. Additionally, asset rights licenses that are associated with the cacheable segments of the media asset can be maintained to assemble, back-fill, and display the on-demand presentation of the media asset for viewing.

BRIEF DESCRIPTION OF THE DRAWINGS

Embodiments of assembling streamed content for on-demand presentation are described with reference to the following drawings. The same numbers are used throughout the drawings to reference like features and components.

DETAILED DESCRIPTION

Embodiments of assembling streamed content for on-demand presentation provide techniques to assemble cacheable segments of streamed content, such as video for a media asset, into an assembled asset data file that can then also be back-filled to upgrade the video quality of the cacheable segments. Accordingly, a user can request a media asset that is streamed for immediate playback and viewing at a client device, yet save a copy of the media asset that is portable and/or available for viewing at time more convenient for the user.

While features and concepts of the described systems and methods for assembling streamed content for on-demand presentation can be implemented in any number of different environments, systems, and/or various configurations, embodiments of assembling streamed content for on-demand presentation are described in the context of the following example systems and environments.

Figure 1:
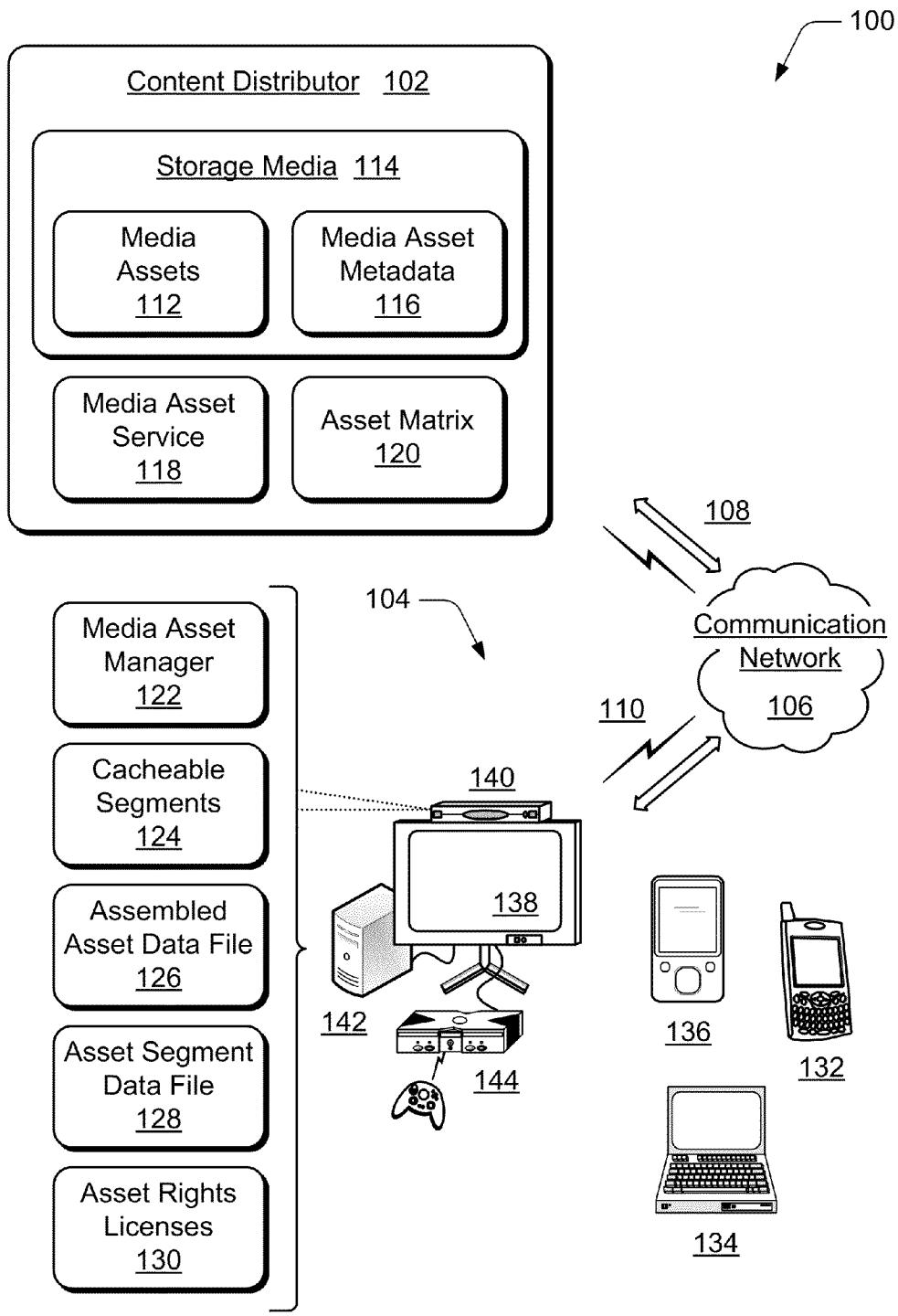
FIG. 1 illustrates an example system in which embodiments of assembling streamed content for on-demand presentation can be implemented.

FIG. 1 illustrates an example system 100 in which various embodiments of assembling streamed content for on-demand presentation can be implemented. In this example, system 100 includes a content distributor 102 that can communicate or otherwise provide media assets and data to any number of various client devices 104 via a communication network 106. Some of the client devices 104 may also be referred to as portable devices and/or user devices. The client devices 104 can include wired and/or wireless devices, some of which may be implemented as components in a client system of a media asset distribution system.

The communication network 106 can be implemented to include a broadcast network, an IP-based network 108, and/or a wireless network 110 that facilitates media asset distribution and data communication between the content distributor 102 and any number of the various devices. The communication network 106 can also be implemented as part of a media asset distribution system using any type of network topology and/or communication protocol, and can be represented or otherwise implemented as a combination of two or more networks. The communication network may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

Content distributor 102 can include one or more media content servers that are implemented to communicate, or otherwise distribute, the media assets 112 and/or other data to any number of the various client devices. In this example system 100, content distributor 102 includes storage media 114 to store or otherwise maintain various data and media assets, such as media assets 112 and media asset metadata 116. The storage media 114 can be implemented as any type of memory, random access memory (RAM), a nonvolatile memory such as flash memory, read only memory (ROM), and/or other suitable electronic data storage.

The media assets 112 can include any type of audio, video, and/or image data received from any type of media content or data source. As described throughout, media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset 112 can include various display formats of the media asset, such as a highest quality display format (e.g., a highest quality, high-definition display format) to a lower quality display format (e.g., a lower quality, standard-definition display format), and any other quality of display format along a continuum between the two.

The media asset metadata 116 can include any type of identifying criteria, descriptive information, and/or attributes associated with the media assets 112 that describes and/or categorizes the media assets. For example, metadata can include a media asset identifier, title, subject description, a date of production, artistic information, music compilations, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

The content distributor 102 includes a media asset service 118 that can be implemented as computer-executable instructions and executed by processors to implement the various embodiments and/or features described herein. In addition, the content distributor 102 can be implemented with any number and combination of differing components as further described with reference to the example device shown in FIG. 6. The media asset service 118, as well as other functionality described to implement embodiments of assembling streamed content for on-demand presentation, can also be provided as a service apart from the content distributor 102 (e.g., on a separate server or by a third party service), or as a distributed service.

In an embodiment, the content distributor 102 may be implemented as a subscription-based service from which any of the various client devices 104 can request media assets 112 to download and display for viewing. The media asset service 118 is implemented to manage the media asset distribution to the various client devices 104. For example, the media asset service 118 can receive a request for a media asset 112 from a client device 104, and stream cacheable segments of the media asset to the client device. The media asset service 118 can initiate conditional streaming of a requested media asset 112 to a client device in the highest quality display format that can be delivered according to the transmission rate of the communication network 106 and/or download limitations at the client device. The video data for a media asset can be delivered in a lower quality display format and the delivery bit rates may change so that the media asset is delivered faster and/or so that a user will be able to watch the media asset uninterrupted (e.g., without the system pausing to catch up on delivery of the media asset).

The media asset service 118 can also provide the client device with an asset matrix 120 that correlates a bit rate and a time position for each cacheable segment in the media asset. In an embodiment, the adaptive streaming solution combined with HTTP delivery can be implemented using an asset matrix 120 for a media asset. Each row of the asset matrix is a different bit rate in a spectrum for HTTP transmission, such as 300 Kpbs up to 3 Mbps. Each column of the asset matrix is then a time position of a cacheable segment in a media asset, such as for cacheable segments that are approximately two-seconds in duration. When a media asset is streamed to a client device for playback, the asset matrix is traversed to download and/or consecutively receive the cacheable segments from the content distributor.

In this example system 100, any of the various client devices 104 include a media asset manager 122 to manage the media assets received from the content distributor 102 for display and viewing at a client device. A media asset manager 122 at a client device 104 can be implemented as computer-executable instructions and executed by processors to implement the various embodiments and/or features described herein. When a media asset is requested by a client device 104, cacheable segments 124 of the media asset are streamed to the client device from the content distributor 102. The client device 104 receives the cacheable segments 124 of the media asset and the media asset manager 122 can initiate a display of the media asset for viewing.

The cacheable segments 124 of the media asset are received in an initial quality display format for uninterrupted playback of the media asset at the client device while the cacheable segments are being received. The media asset manager 122 can initiate that the metadata 116 corresponding to each of the cacheable segments 124 of the media asset is maintained at the client device 104. The metadata can indicate the initial quality display format of each of the cacheable segments of the media asset that are received. In an implementation, the cacheable segments 124 are approximately two-seconds in duration of the media asset, and can be assembled, or otherwise stitched together, to generate the media asset for display. The metadata 116 can also include information about the quality level at which each of the cacheable segments was provided for decoding, and upgrade decisions.

The client device 104 also receives the asset matrix 120 from the content distributor 102. The asset matrix corresponds to the media asset and correlates a bit rate and a time position for each cacheable segment in the media asset. The media asset manager 122 can utilize the asset matrix to assemble the cacheable segments 124 of the media asset to generate an assembled asset data file 126 of the media asset. The assembled asset data file 126 is a cohesive file of the media asset and can be maintained, or otherwise stored, at the client device 104 for on-demand presentation when the media asset is selected for viewing. In implementations, the assembled asset data file 126 is a combination of the cacheable segments 124, which are video segments of the media asset, and audio segments that correlate to the video segments.

The media asset manager 122 at a client device 104 can also be implemented to select one or more of the cacheable segments 124 to back-fill the assembled asset data file 126 based on display content corresponding to the cacheable segments that will visually upgrade the media asset when displayed for viewing. The back-fill process can be implemented to evaluate the quality indexing metadata and download a higher quality version of selected cacheable segments for the assembled asset data file. The media asset manager 122 can then request the selected cacheable segments from the content distributor 102 based on an identification of the selected cacheable segments in the asset matrix 120. The selected cacheable segments can be downloaded from the content distributor 102 when excess bandwidth and/or a different network is available. In implementations, the network via which updated, higher quality segments of the media presentation are received may be a different network from that which delivered the original cacheable segments. For example, the cacheable segments for a media asset may be originally acquired via a low quality network, and the media asset manager 122 can then wait for a high quality network connection via which to request the improved, selected cacheable segments.

The media asset manager 122 can regulate the bandwidth utilized to download the selected cacheable segments when the assembled asset data file is back-filled with the selected cacheable segments. An algorithm can be implemented to determine how much bandwidth to utilize for the back-fill process, and how much bandwidth to reserve for streaming the cacheable segments of the media asset. Additionally, the content distributor 102 can implement bit-rate throttling to deliver the selected cacheable segments for the back-fill process slower than the cacheable segments are downloaded when a requested media asset is streamed to a client device. The back-fill process can be on-going while a requested media asset is streamed to a client device, and the back-fill process utilizes a small amount of available bandwidth as a background process. In addition to determining how much bandwidth to utilize or allocate for the back-fill process while a requested media asset is being streamed to a client device, the media asset manager 122 can be implemented to suspend or postpone the backfill process until sufficient network throughput is available and has been obtained.

The assembled asset data file 126 can then be back-filled with the selected cacheable segments that are replaced with a highest quality display format for an on-demand presentation of the media asset when later selected for viewing. The media asset manager 122 can evaluate the cacheable segments 124 of a media asset for the video to display at a higher quality for an improved viewing perception. For example, an action scene in a video can be displayed with higher quality video, while a slow moving or nonmoving scene will display with lower quality video. The cacheable segments 124 can be prioritized according to those that make the biggest viewing perception of quality to a user. Additionally, the media asset manager 122 can implement a quality detection or motion estimation technique to determine scenes in the video that would benefit the most from the back-fill process.

In an implementation, the back-fill process can specify the selected cacheable segments external to the asset segment data file 128. The client device 104 can maintain, or otherwise store, an asset segment data file 128 of the selected cacheable segments that are received from the content distributor 102.

The asset segment data file 128 is a separate data file than the assembled asset data file 126 of the media asset, and the selected cacheable segments can be stored in the separate data file when received to avoid corrupting the media asset if the system or process crashes.

The client device 104 can also maintain, or otherwise store, the asset rights licenses 130 that are associated with the cacheable segments 124 of the media asset to assemble, back-fill, and display the on-demand presentation of the media asset for viewing. In an implementation, Digital Rights Management (DRM) licenses are maintained to facilitate the assembly, back-fill, and playback of a media asset in compliance with asset rights provided by the content owner.

In this example system 100, wireless devices can include any type of device implemented to receive and/or communicate wireless data, such as any one or combination of a mobile phone 132 (e.g., cellular, VoIP, WiFi, etc.), a portable computer device 134, a media device 136 (e.g., a personal media player, portable media player, etc.), and/or any other wireless device that can receive media assets in any form of audio, video, and/or image data. A client system can include a respective client device and display device 138 that together render or playback any form of audio, video, and/or image media content and media assets.

The display device 138 can be implemented as any type of a television, high definition television (HDTV), LCD, or similar display system. A client device can be implemented as any one or combination of a television client device 140 (e.g., a television set-top box, a digital video recorder (DVR), etc.), a computer device 142, a gaming system 144, an appliance device, an electronic device, and/or as any other type of client device or user device that may be implemented to receive media assets in any form of audio, video, and/or image data in a media asset distribution system.

Any of the various client devices 104 can be implemented with one or more processors, communication components, memory components, signal processing and control circuits, and a media asset rendering system. Further, any of the wireless devices and/or other client devices can be implemented with any number and combination of differing components as further described with reference to the example device shown in FIG. 2, and with reference to the example device shown in FIG. 6. A client device may also be associated with a user (i.e., a person) and/or an entity that operates the device such that a user device describes logical devices that include users, software, and/or a combination of devices.

Any of the client devices 104 can communicate with content distributor 102 via a two-way data communication link of the communication network 106. It is contemplated that any one or more of the arrowed communication links, along with communication network 106, facilitate two-way data communication, such as from a client device 104 to the content distributor 102 and vice-versa.

Figure 2:
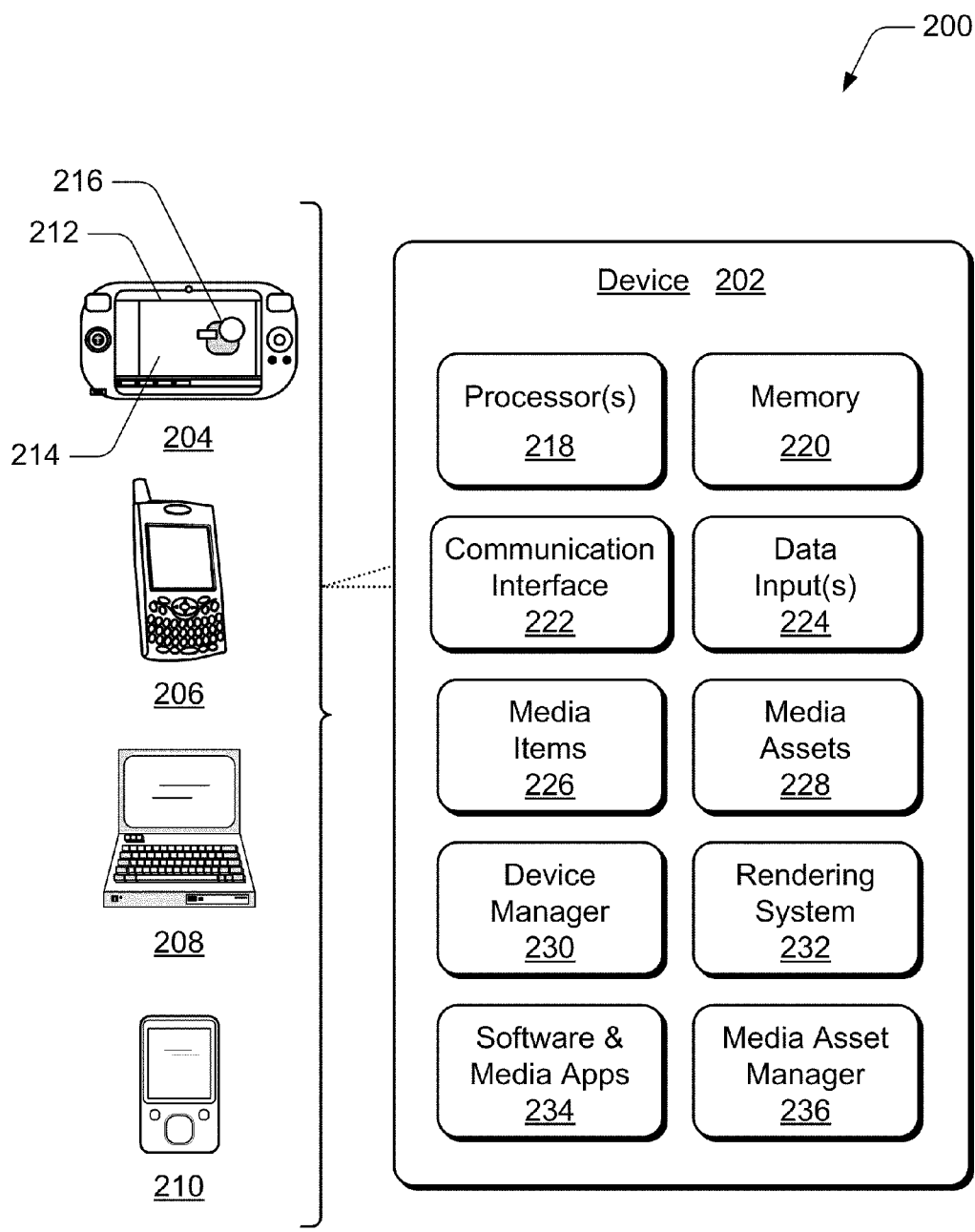
FIG. 2 illustrates an example system and client device in which embodiments of assembling streamed content for on-demand presentation can be implemented.

FIG. 2 illustrates an example system 200 in which various embodiments of assembling streamed content for on-demand presentation can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices (e.g., also referred to as client devices) can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of an icon, image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 6. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a memory 220, a communication interface 222 for data, messaging, and/or voice communications, and data inputs 224 to receive media items 226 and/or media content, as well as media assets 228. Media items can include any type of email messages, text messages, digital photos, song selections, and the like. Media content (e.g., to include recorded media content) can include any type of audio, video, and/or image data received from any media content or data source, such as messages, television media content, music, video clips, data feeds, interactive games, network-based applications, and any other content.

Portable device 202 is implemented with a device manager 230 that includes any one or combination of a control application, software application, signal processing and control module, code that is native to the particular device, and/or a hardware abstraction layer for the particular device. Portable device 202 also includes a rendering system 232 to render user interfaces and user interface elements for display on any of the portable devices. The rendering system 232 is also implemented to receive and render any form of audio, video, and/or image data received from any media content and/or data source.

Portable device 202 includes various software and/or media applications 234 that may incorporate components and/or modules that can be processed or otherwise executed by the processors 218. The media applications 234 can include a music and/or video player, a Web browser, an email application, a messaging application, a photo viewer, and the like. The software and/or media applications 234 can also include an operating system and a media asset manager 236 to implement various embodiments of assembling streamed content for on-demand presentation at a client device as described herein. Features and aspects of the media asset manager 236 are described with reference to the media asset manager 122 shown in FIG. 1 at a client device 104.

Example methods 300, 400, and 500 are described with reference to respective FIGS. 3, 4, and 5 in accordance with one or more embodiments of assembling streamed content for on-demand presentation. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platform-independent and can be implemented on a variety of computing platforms having a variety of processors.

Figure 3:
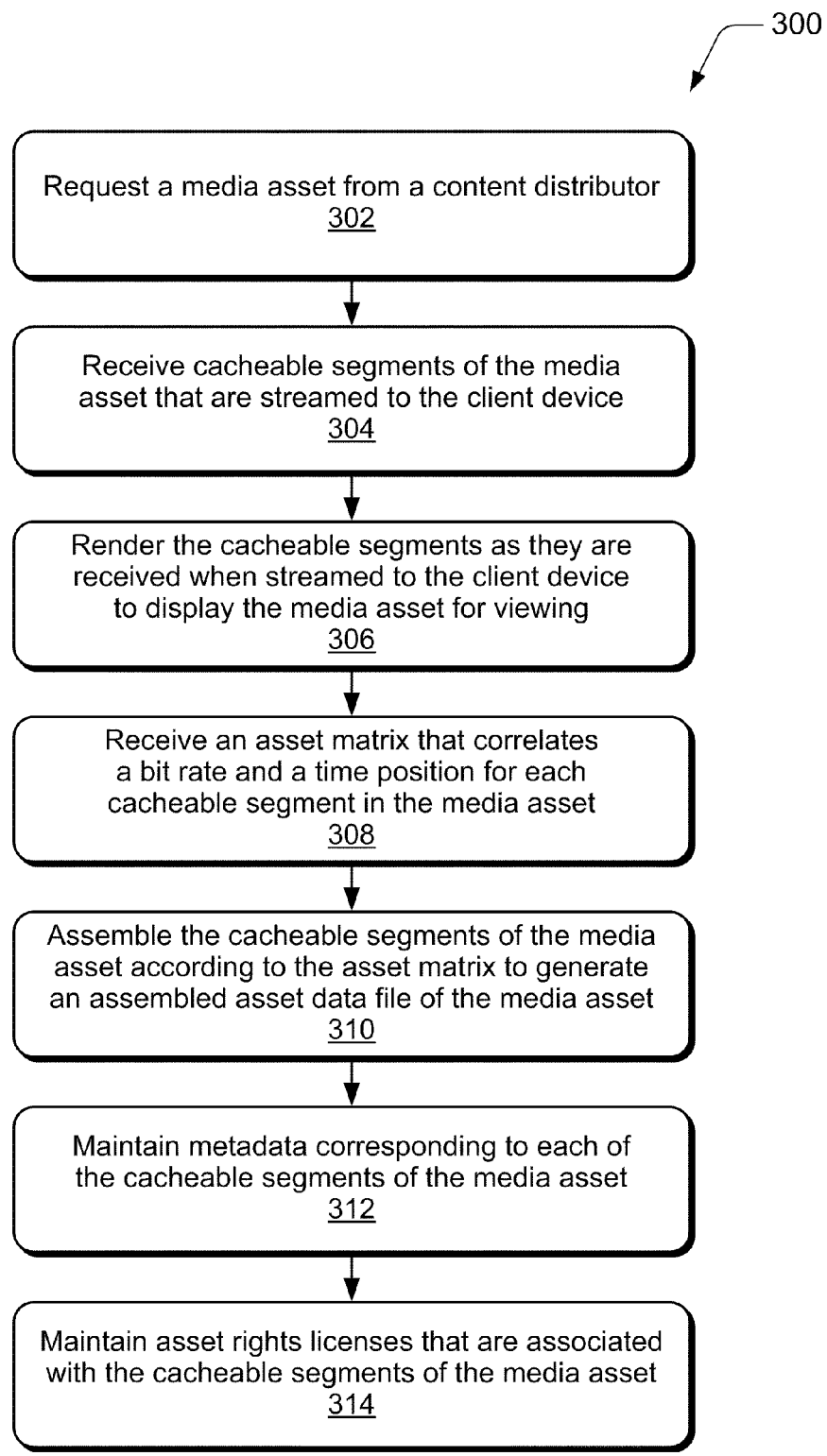
FIG. 3 illustrates example method(s) for assembling streamed content for on-demand presentation in accordance with one or more embodiments.

FIG. 3 illustrates example method(s) 300 of assembling streamed content for on-demand presentation, and is described with reference to a client device. The order in which the method is described is not intended to be construed as a limitation, and any number of the described method blocks can be combined in any order to implement the method, or an alternate method.

At block 302, a media asset is requested from a content distributor. For example, a client device 104 requests to receive a media asset 112 from content distributor 102, such as when the content distributor 102 is implemented as a subscription-based service from which any of the various client devices 104 can request media assets 112 to download and display for viewing. At block 304, cacheable segments of the media asset are received that are streamed to the client device. For example, a client device 104 receives cacheable segments 124 of the media asset from the content distributor 102. In an implementation, the cacheable segments 124 are received in an initial quality display format for uninterrupted playback of the media asset at the client device while the cacheable segments are being received.

At block 306, the cacheable segments are rendered as they are received when streamed to the client device to display the media asset for viewing. For example, the client device 104 receives the cacheable segments 124 of the media asset and the media asset manager 122 initiates a display of the media asset for viewing. At block 308, an asset matrix that correlates a bit rate and a time position for each cacheable segment in the media asset is received. For example, the client device 104 receives an asset matrix 120 from the content distributor 102. The asset matrix corresponds to the media asset and correlates a bit rate and a time position for each cacheable segment 124 in the media asset.

At block 310, the cacheable segments of the media asset are assembled according to the asset matrix to generate an assembled asset data file of the media asset. For example, the media asset manager 122 at a client device 104 utilizes the asset matrix to assemble the cacheable segments 124 of the media asset to generate an assembled asset data file 126 of the media asset. The assembled asset data file 126 is a cohesive file of the media asset and can be maintained, or otherwise stored, at the client device 104 for on-demand presentation when the media asset is selected for viewing.

At block 312, metadata corresponding to each of the cacheable segments of the media asset are maintained. For example, the client device 104 maintains or otherwise stores the metadata 116 that corresponds to each of the cacheable segments 124 of the media asset. The metadata indicates the initial quality display format of each of the cacheable segments and/or indicates the cacheable segments to select to back-fill the assembled asset data file to visually upgrade the media asset when displayed for viewing. At block 314, asset rights licenses that are associated with the cacheable segments of the media asset are maintained. For example, the client device 104 maintains or otherwise stores the asset rights licenses 130 that are associated with the cacheable segments 124 of the media asset to assemble, back-fill, and display the on-demand presentation of the media asset for viewing.

Figure 4:
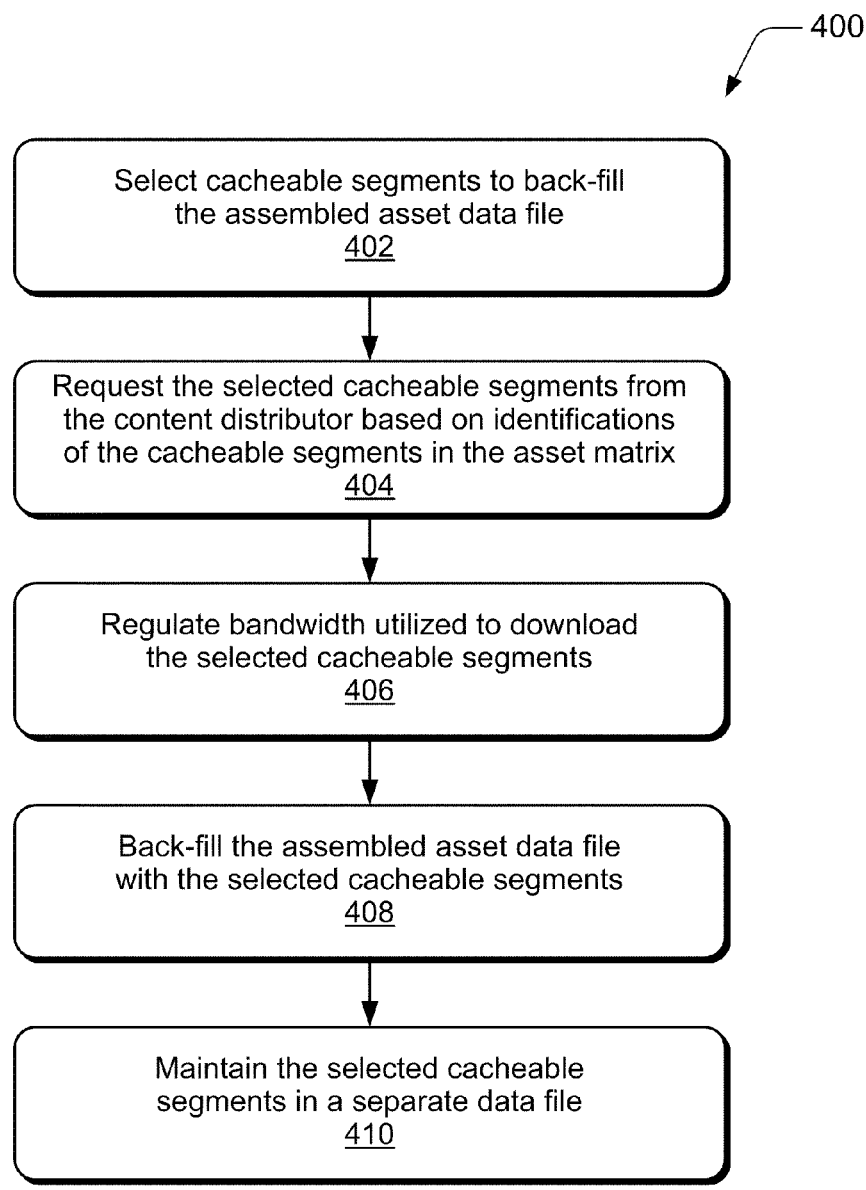
FIG. 4 illustrates additional example method(s) for assembling streamed content for on-demand presentation in accordance with one or more embodiments.

FIG. 4 illustrates example method(s) 400 of assembling streamed content for on-demand presentation, and is described with reference to a client device. The order in which the method is described is not intended to be construed as a limitation, and any number of the described method blocks can be combined in any order to implement the method, or an alternate method.

At block 402, cacheable segments are selected to back-fill the assembled asset data file. For example, the media asset manager 122 at a client device 104 selects one or more of the cacheable segments 124 to back-fill the assembled asset data file 126 based on display content corresponding to the cacheable segments that will visually upgrade the media asset when displayed for viewing. The back-fill process downloads a higher quality version of the selected cacheable segments for the assembled asset data file.

At block 404, the selected cacheable segments are requested from the content distributor based on identifications of the cacheable segments in the asset matrix. For example, the media asset manager 122 requests the selected cacheable segments from the content distributor 102 based on an identification of the selected cacheable segments in the asset matrix 120. The selected cacheable segments are downloaded from the content distributor 102 when excess bandwidth is available.

At block 406, bandwidth utilized to download the selected cacheable segments is regulated. For example, the media asset manager 122 regulates the bandwidth utilized to download the selected cacheable segments from the content distributor 102 when the assembled asset data file is back-filled with the selected cacheable segments.

At block 408, the assembled asset data file is back-filled with the selected cacheable segments. For example, the media asset manager 122 evaluates the cacheable segments 124 of the media asset for the video to display at a higher quality for an improved viewing perception. The selected cacheable segments are replaced with a highest quality display format for on-demand presentation of the media asset when selected for viewing.

At block 410, the selected cacheable segments are maintained in a separate data file. For example, the client device 104 maintains, or otherwise stores, the asset segment data file 128 of the selected cacheable segments that are received from the content distributor 102. The asset segment data file 128 is a separate data file than the assembled asset data file 126 of the media asset.

Figure 5:
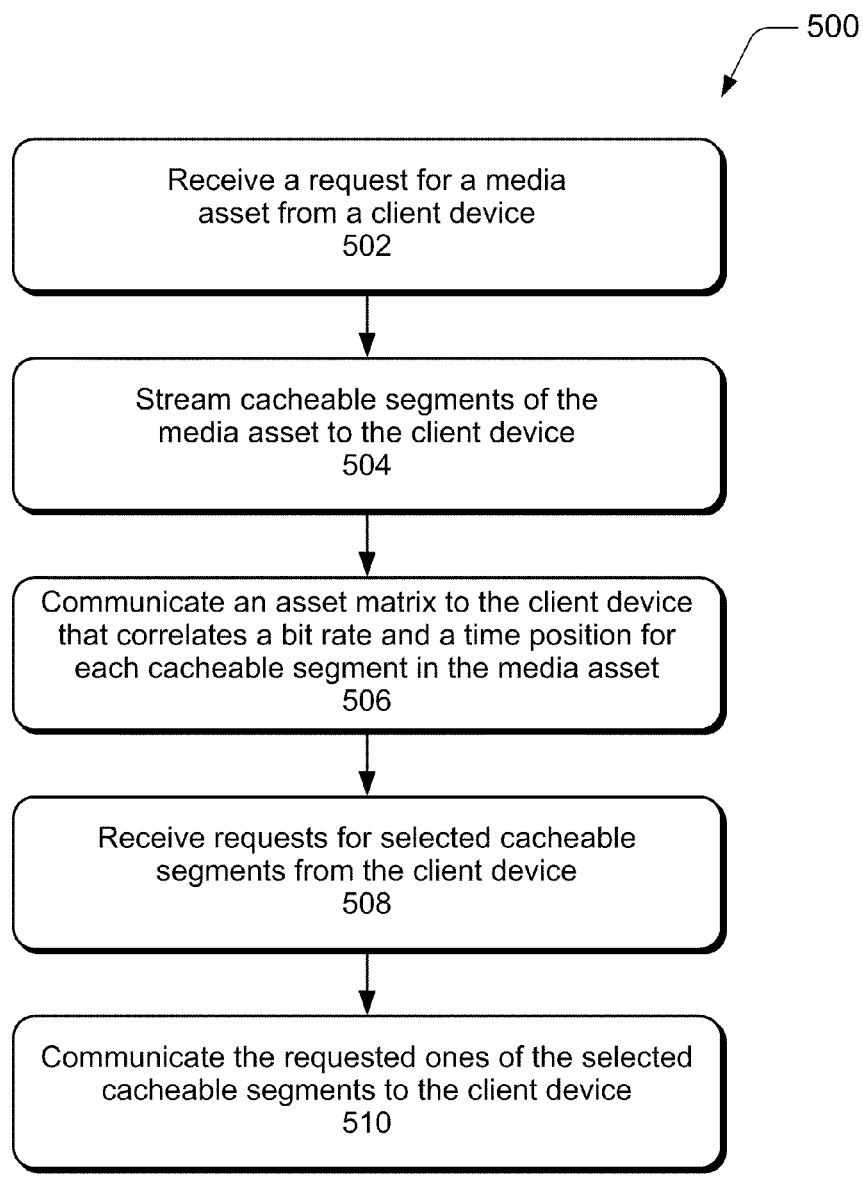
FIG. 5 illustrates additional example method(s) for assembling streamed content for on-demand presentation in accordance with one or more embodiments.

FIG. 5 illustrates example method(s) 500 of assembling streamed content for on-demand presentation, and is described with reference to a content distributor. The order in which the method is described is not intended to be construed as a limitation, and any number of the described method blocks can be combined in any order to implement the method, or an alternate method.

At block 502, a request for a media asset is received from a client device. For example, the media asset service 118 at content distributor 102 receives a request for a media asset 112 from a client device 104. At block 504, the media asset service 118 at content distributor 102 initiates streaming the cacheable segments 124 of the media asset to the client device where the client device renders the cacheable segments as they are received to display the media asset for viewing. The cacheable segments 124 are streamed to the client device in an initial quality display format for uninterrupted playback of the media asset 112 at the client device while the cacheable segments are being received.

At block 506, an asset matrix is communicated to the client device, where the asset matrix correlates a bit rate and a time position for each cacheable segment in the media asset. For example, the media asset service 118 at content distributor 102 also provides the client device 104 with an asset matrix 120 that correlates a bit rate and a time position for each cacheable segment 124 in the media asset 112. The client device can then assemble the cacheable segments 124 of the media asset 112 according to the asset matrix 120 to generate the assembled asset data file 126 of the media asset.

At block 508, requests for selected cacheable segments are received from the client device. For example, the content distributor 102 receives requests for selected cacheable segments that the client device 104 selects to back-fill the assembled asset data file 126 based on display content corresponding to the cacheable segments that will visually upgrade the media asset when displayed for viewing. The content distributor 102 receives the requests for the selected cacheable segments based on an identification of a cacheable segment in the asset matrix.

At block 510, communicate the requested ones of the selected cacheable segments to the client device. For example, the media asset service 118 initiates communicating the requested ones of the selected cacheable segments to the client device 104 that back-fills the assembled asset data file 126 with the selected cacheable segments.

Figure 6:
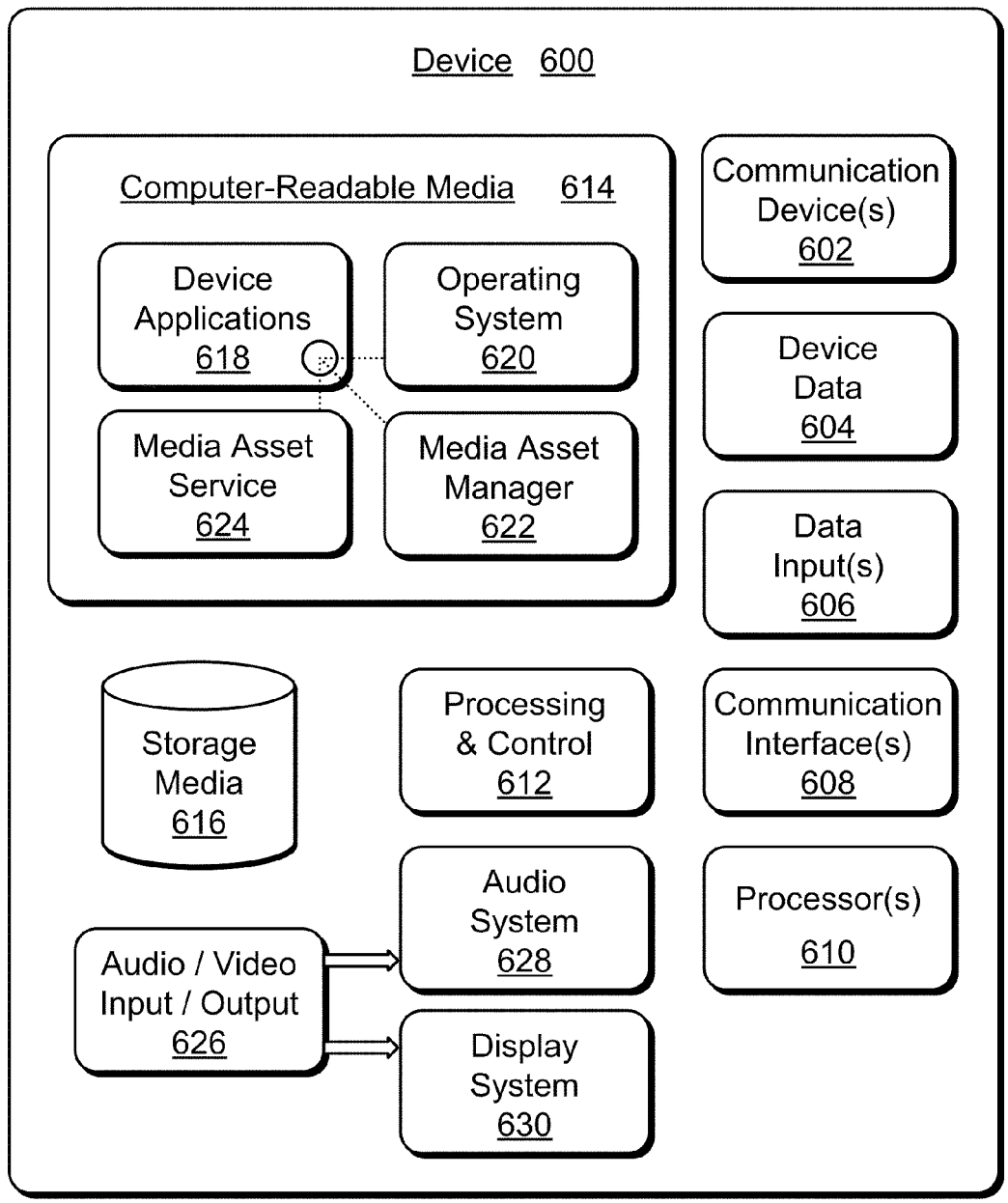
FIG. 6 illustrates various components of an example device that can implement embodiments of assembling streamed content for on-demand presentation.

FIG. 6 illustrates various components of an example device 600 that can be implemented as any type of device and/or content distributor as described with reference to FIGS. 1 and 2 to implement embodiments of assembling streamed content for on-demand presentation. In embodiments, device 600 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 600 may also be associated with a user (i.e., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of assembling streamed content for on-demand presentation. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of assembling streamed content for on-demand presentation. In this example, the device applications 618 can include a media asset manager 622 when device 600 is implemented as a client device, and can include a media asset service 624 when device 600 is implemented as a server device or content distributor. The media asset manager 622 and the media asset service 624 are shown as software modules and/or computer applications. Alternatively or in addition, the media asset manager 622 and the media asset service 624 can be implemented as hardware, software, firmware, or any combination thereof.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Although embodiments of assembling streamed content for on-demand presentation have been described in language specific to features and/or methods, it is to be understood that the subject of the appended claims is not necessarily limited to the specific features or methods described. Rather, the specific features and methods are disclosed as example implementations of assembling streamed content for on-demand presentation.

The invention claimed is:

1. A computer-implemented method at a client device, comprising:
   requesting a media asset from a content distributor;
   receiving cacheable segments of the media asset that are streamed to the client device, the cacheable segments received in an initial quality display format for uninterrupted playback of the media asset at the client device while the cacheable segments are being received;
   receiving an asset matrix that correlates a bit rate and a time position for each cacheable segment in the media asset;
   assembling the cacheable segments of the media asset according to the asset matrix to generate an assembled asset data file of the media asset, the assembled asset data file being a single cohesive file of the media asset; and
   back-filling the assembled asset data file at the client device with selected ones of the cacheable segments that are replaced with a highest quality display format for on-demand presentation of the media asset when selected for viewing.

2. A computer-implemented method as recited in claim 1, further comprising rendering the cacheable segments as the cacheable segments are received when streamed to the client device to display the media asset for viewing.

3. A computer-implemented method as recited in claim 1, further comprising requesting the selected ones of the cacheable segments from the content distributor based on an identification of a cacheable segment in the asset matrix.

4. A computer-implemented method as recited in claim 1, further comprising selecting the selected ones of the cacheable segments to back-fill the assembled asset data file based on display content corresponding to the cacheable segments that will visually upgrade the media asset when displayed for viewing.

5. A computer-implemented method as recited in claim 1, further comprising maintaining metadata corresponding to each of the cacheable segments of the media asset, the metadata indicating at least the initial quality display format of each of the cacheable segments.

6. A computer-implemented method as recited in claim 1, further comprising regulating bandwidth utilized to download the selected ones of the cacheable segments when said back-filling the assembled asset data file.

7. A computer-implemented method as recited in claim 1, further comprising maintaining the selected ones of the cacheable segments in a separate data file when said back-filling the assembled asset data file.

8. A computer-implemented method as recited in claim 1, further comprising maintaining asset rights licenses that are associated with said receiving the cacheable segments of the media asset to assemble, back-fill, and display the on-demand presentation of the media asset for viewing.

9. A client device, comprising:
storage media configured to maintain an assembled asset data file of a media asset for on-demand presentation when the media asset is selected for viewing;
at least a memory and a processor that implement a media asset manager to manage the media assets received from a content distributor and displayed for viewing, the media asset manager configured to:
receive cacheable segments of the media asset that are streamed to the client device, the cacheable segments received in an initial quality display format for uninterrupted playback of the media asset at the client device while the cacheable segments are being received;
if a user input is received to request playback of the media asset for viewing while the cacheable segments are being received, initiate the uninterrupted playback of the media asset at the initial quality display format; or
the media asset manager is further configured to:
receive an asset matrix that correlates a bit rate and a time position for each cacheable segment in the media asset;
assemble the cacheable segments of the media asset according to the asset matrix to generate the assembled asset data file of the media asset, the assembled asset data file being a single cohesive file of the media asset; and
back-fill the assembled asset data file with selected ones of the cacheable segments that are replaced with a highest quality display format for the on-demand presentation of the media asset when selected for viewing.

10. A client device as recited in claim 9, wherein the media asset manager is further configured to initiate a display of the media asset for viewing as the cacheable segments are received when streamed to the client device.

11. A client device as recited in claim 9, wherein the media asset manager is further configured to request the selected ones of the cacheable segments from the content distributor based on an identification of a cacheable segment in the asset matrix.

12. A client device as recited in claim 9, wherein the media asset manager is further configured to select the selected ones of the cacheable segments to back-fill the assembled asset data file based on display content corresponding to the cacheable segments that will visually upgrade the media asset when displayed for viewing.

13. A client device as recited in claim 9, wherein the media asset manager is further configured to maintain metadata corresponding to each of the cacheable segments of the media asset, the metadata indicating at least the initial quality display format of each of the cacheable segments.

14. A client device as recited in claim 9, wherein the media asset manager is further configured to regulate bandwidth utilized to download the selected ones of the cacheable segments when the assembled asset data file is back-filled with the selected ones of the cacheable segments.

15. A client device as recited in claim 9, wherein the storage media is further configured to maintain an asset segment data file of the selected ones of the cacheable segments, the asset segment data file being a separate data file than the assembled asset data file of the media asset.

16. A client device as recited in claim 9, wherein the storage media is further configured to maintain asset rights licenses that are associated with the cacheable segments of the media asset to assemble, back-fill, and display the on-demand presentation of the media asset for viewing.

17. Computer-readable media having stored thereon computer-executable instructions that, when executed by a client device, initiate the client device to:
receive cacheable segments of a media asset that are streamed to the client device, the cacheable segments received in an initial quality display format for uninterrupted playback of the media asset at the client device while the cacheable segments are being received;
receive an asset matrix that correlates a bit rate and a time position for each cacheable segment in the media asset;
assemble the cacheable segments of the media asset according to the asset matrix to generate an assembled asset data file of the media asset, the assembled asset data file being a single cohesive file of the media asset; and
back-fill the assembled asset data file with selected ones of the cacheable segments that are replaced with a highest quality display format for on-demand presentation of the media asset when selected for viewing.

18. Computer-readable media as recited in claim 17, wherein the computer-executable instructions, when executed, further initiate the client device to maintain metadata corresponding to each of the cacheable segments of the media asset, the metadata indicating at least the initial quality display format of each of the cacheable segments, and the metadata indicating the cacheable segments to select to back-fill the assembled asset data file to visually upgrade the media asset when displayed for viewing.

19. Computer-readable media as recited in claim 17, wherein the computer-executable instructions, when executed, further initiate the client device to regulate bandwidth utilized to download the selected ones of the cacheable segments when the assembled asset data file is back-filled with the selected ones of the cacheable segments.

20. Computer-readable media as recited in claim 17, wherein the computer-executable instructions, when executed, further initiate the client device to:
maintain the selected ones of the cacheable segments in a separate data file when the assembled asset data file is back-filled with the selected ones of the cacheable segments; and
maintain asset rights licenses that are associated with the cacheable segments of the media asset to assemble, back-fill, and display the on-demand presentation of the media asset for viewing.

* * * * *